United States Patent
Newton

(10) Patent No.: US 6,669,506 B2
(45) Date of Patent: Dec. 30, 2003

(54) TRAINLINE JUNCTION BOX

(75) Inventor: Steven R. Newton, Adams, NY (US)

(73) Assignee: New York Air Brake Corporation, Watertown, NY (US)

( * ) Notice: Subject to any disclaimer, the term of this patent is extended or adjusted under 35 U.S.C. 154(b) by 2 days.

(21) Appl. No.: 10/138,269

(22) Filed: May 6, 2002

(65) Prior Publication Data

US 2003/0207614 A1 Nov. 6, 2003

(51) Int. Cl.[7] .............................................. H01R 13/73
(52) U.S. Cl. ........................ 439/559; 439/564; 439/569
(58) Field of Search .......................... 439/35, 503, 559, 439/544, 569, 578, 550, 551, 546, 535, 564

(56) References Cited

U.S. PATENT DOCUMENTS 5,769,661 A * 6/1998 Nealis ......................... 439/551
5,947,766 A * 9/1999 Tsuji et al. .................. 439/559
6,056,599 A * 5/2000 Flickinger et al. .......... 439/598
6,227,865 B1 * 5/2001 Matsumoto et al. .......... 439/15
6,540,385 B2 * 4/2003 Ikeda et al. ................. 439/546

FOREIGN PATENT DOCUMENTS

JP          4-237980      * 8/1992

* cited by examiner

Primary Examiner—Tho D. Ta
(74) Attorney, Agent, or Firm—Barnes & Thornburg

(57) ABSTRACT

A junction box for a trainline including a housing having a lid and a body with a first non-circular opening in a first side wall of the body. An electrical connector extends through the opening, and a portion of the exterior surface of the connector has a non-circular shape and forms a non-rotational fit with the first opening. A flange of the connector is mounted to the exterior surface of the first wall and seals the first opening. The connector includes an electrical receptacle having a first portion of the exterior surface of the connector and a threaded second portion of the exterior surface of the connector. A gasket is positioned between the flange and the first wall encompassed in the first opening. The first non-circular opening may be generally triangular.

17 Claims, 7 Drawing Sheets

TRAINLINE JUNCTION BOX

BACKGROUND AND SUMMARY OF THE INVENTION

The present invention relates generally to junction boxes and, more specifically, for an improved junction box for the electrical trainline of a train.

Trains, in general, and freight trains, in particular, have pneumatic brakes. Trains include a plurality of cars interconnected to each other and pulled by a locomotive or include their own locomotion within one of the cars. At least one fluid pipe interconnects each of the cars. In trains that have electrical capability, a trainline is interconnected between each of the cars and/or locomotive. The junction box is generally provided at each end of the car or locomotive. The electrical cable line within the car is connected at a terminal block within the junction box. An electrical connector receptacle is also provided in the junction box and connected to the terminal block. The cable is then received in the connector/receptacle to interconnect between a pair of cars. An example of a terminal block for an electrically-controlled pneumatic brake application is illustrated in U.S. Pat. No. 6,283,765. A junction box on the end of a locomotive is illustrated in U.S. Pat. No. 4,017,136. The incorporation of the terminal block of U.S. Pat. No. 6,283,765 into a junction box is illustrated in FIGS. 1 and 2.

The end of car connector ("EOC") has been standardized in freight cars by the American Association of Railroads. This particular connector threadably receives the cable. As mounted in the junction box of prior art FIGS. 1 and 2, this connector is susceptible to rotation during connection and disconnection. This effects any attempt to create a seal where the connector extends through the wall of the housing. This is very detrimental in the environment to which the trains are exposed.

A junction box of the present invention includes a housing having a lid and a body with a first non-circular opening in a first side wall of the body. An electrical connector extends through the opening. A portion of the exterior surface of the connector has a non-circular shape and forms a non-rotational fit with the first opening. A flange of the connector is mounted to the exterior surface of the first wall and seals the first opening. The connector includes an electrical receptacle having a first portion of the exterior surface of the connector and a threaded second portion of the exterior surface of the connector. The flange may include an interior threaded portion joining the flange to the receptacle of the second portion of the exterior surface of the connector. Alternatively, the flange may be formed as a unitary portion of the connector. The flange may include a pair of ears, and fasteners extend through each ear to the first wall. A gasket is positioned between the flange and the first wall encompassing the first opening. The gasket may be an o-ring in a recess in the flange. A recess may be provided in the first wall to receive the flange. The first non-circular opening may be generally triangular. The non-circular shape of the first portion of the connector may be circular with a flat.

The housing may include external ears extending laterally from the base of the side walls of the body. Each ear having an opening for receiving a fastener and to mount the housing to a rail vehicle. The foot print of the housing with the ears may be rectangular and/or square. A recess may be provided in the top wall of the housing and includes a gasket. The lid may include self-retaining fasteners. Also, a lanyard may connect the body to the lid. A terminal block is provided in the housing, and the electrical connector includes wires connected to the terminal block. The junction box may include one or more second openings in a second wall of the body and a cable fitting extending from the second opening.

These and other aspects of the present invention will become apparent from the following detailed description of the invention, when considered in conjunction with accompanying drawings.

DETAILED DESCRIPTION OF THE PREFERRED EMBODIMENTS

Figure 1:
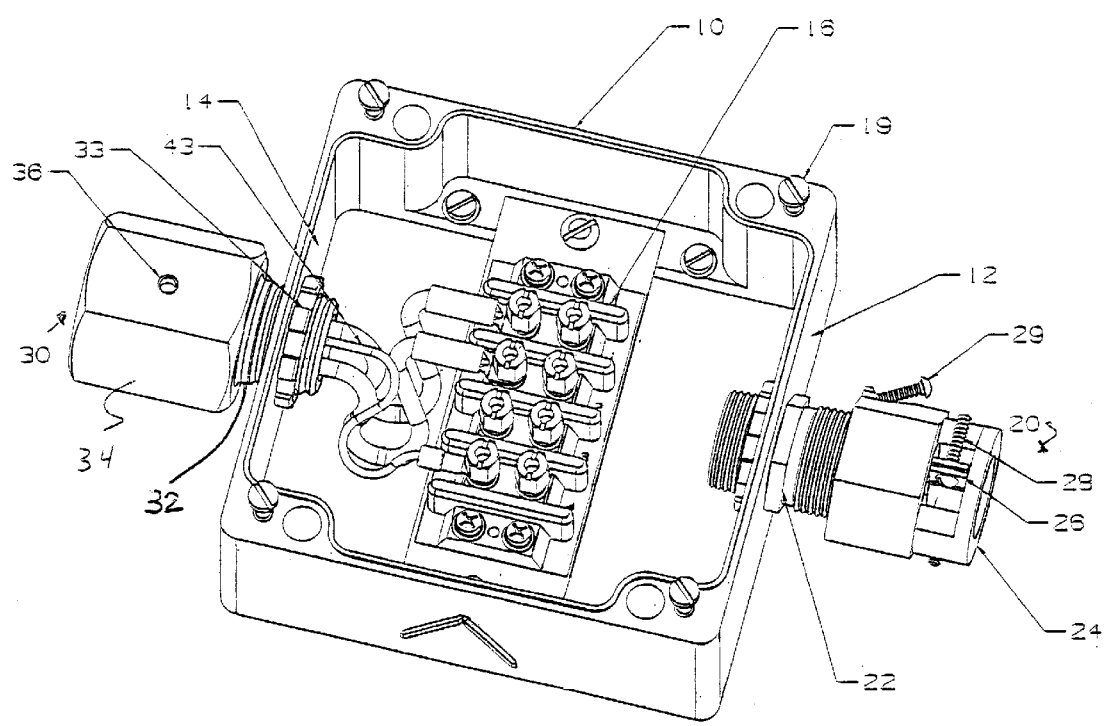
FIG. 1 is a perspective view of a junction box of the prior art with the lid removed.
Figure 2:
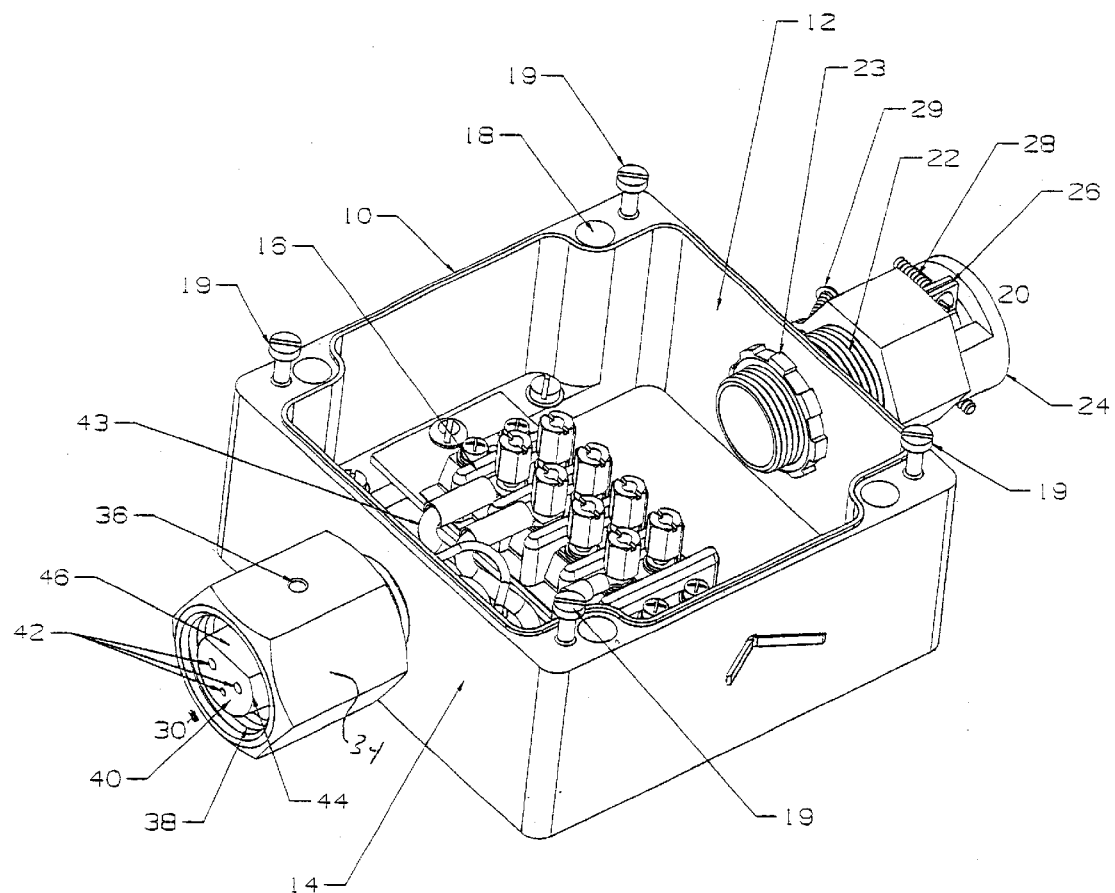
FIG. 2 is an enlarged partial view of the prior art junction box of FIG. 1.

A junction box for a trainline on the prior art is illustrated in FIGS. 1 and 2. The body 10 is shown without the lid and includes a pair of opposed walls 12, 14. A terminal block 16 is mounted in the interior of the housing. Fastener apertures 18 are provided adjacent to the corners of the walls of the housing and through which fasteners extend and mount the body 10 of the housing to the car. Fasteners 19 secure the lid to the body of the junction box. A fitting 20 includes a threaded sleeve 22, which secures the fitting 20 in an opening in the side wall 12. Interior nut 23 secures the threaded sleeve 22 to the wall 12. A strain relief 24 is threadably received on the threaded sleeve 22 and includes a split collar 26, which is tightened by a screw 28. A grounding fastener 29 is provided on the strain relief 24. A car trainline wire cable is received through the strain relief 24, and its wires are connected to the terminal block 16. Split collar 26 secures the cable in the strain relief 24. This is the cable that runs through the cars between a pair of junction boxes at each end of the car.

An end of car fitting 30 is mounted to side wall 14 of the body 10 of the junction box. An exterior portion of the EOC fitting 30 is threadably received in an opening in the wall 14. This is secured to the inner surface of the wall 14 by an interior nut 33. As shown in FIG. 2, the end of car fitting 30 includes a connector 40 with three receptacle openings 42. Connector 40 is threaded into portion 34 of the EOC fitting 30 and secured from rotation with set screw 36. Wires 43 connect the connector 40 to the terminal block 16.

The exterior surface of the non-threaded portion of the connector 40 is generally circular 44 and includes a flat 46. The cable which is received at the end of train connector includes a semi-circular recess for the flat 46 to align with the exterior configuration of the connector 40 and includes a sleeve with an external thread to be received on the internal threading 38 of EOC fitting 30.

The walls 14 of body 10 are relatively thin, and, therefore, the threading 32 can only engage the housing wall with one or two turns. This makes this interconnection weak and vulnerable to damage and seepage, which prevents the moisture tightness of the enclosure for the junction box. It should be noted that the terminal box housing illustrated in FIGS. 1 and 2 is an off-the-shelf aluminum housing.

Figure 3:
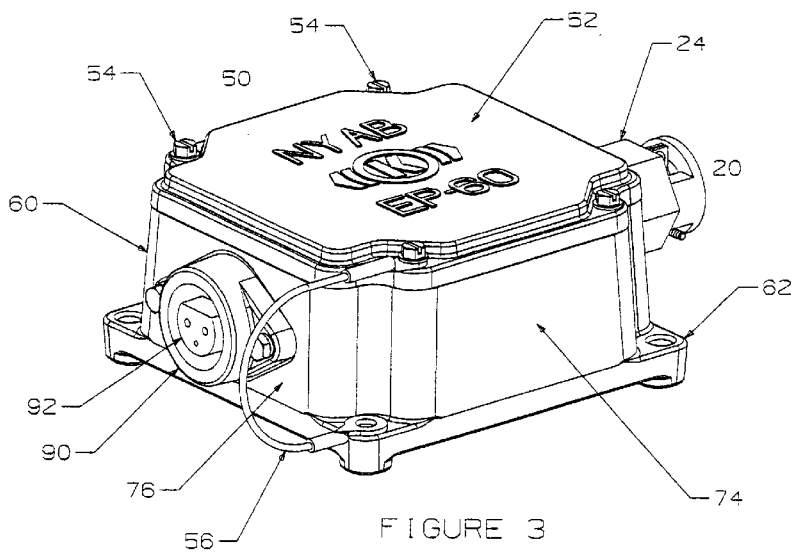
FIG. 3 is a perspective view of a junction box incorporating the principles of the present invention.

The junction box of the present invention is illustrated in FIGS. 3–8. Housing 50 includes a lid 52 and a body 60, as illustrated in FIG. 3. Fasteners 54 secure the lid 52 to the housing 50. A lanyard 56 is connected to the lid 52 and to the body 60 at ears 62. Fasteners 58, which extend through the ears 62 and the lanyard 56, connect the housing 50 to a car. Similarly, the fasteners 54 may be self-retained to the lid 52. At a minimum, the lanyard 56 should be secured to the lid 52 such that when the lid 52 is removed to service the terminal block 16, it is not lost.

Figure 4:
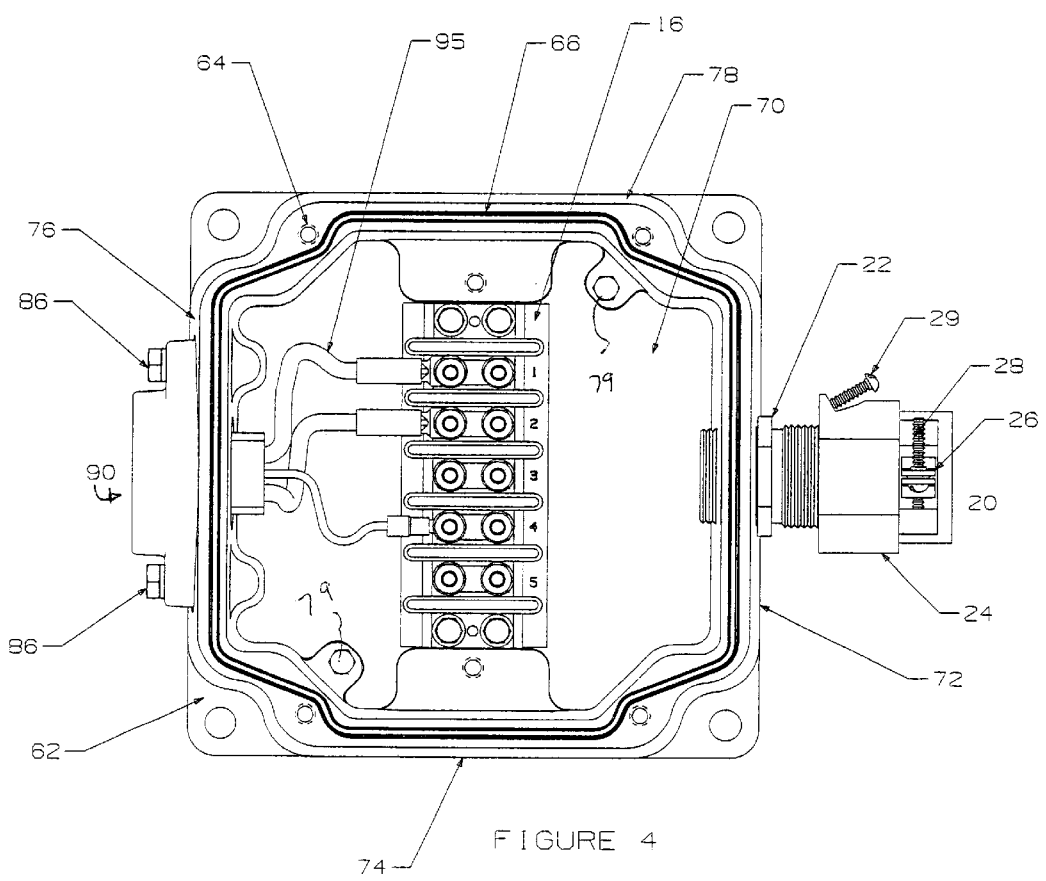
FIG. 4 is a plane view of a junction box with the lid off incorporating the principles of the present invention.
Figure 5:
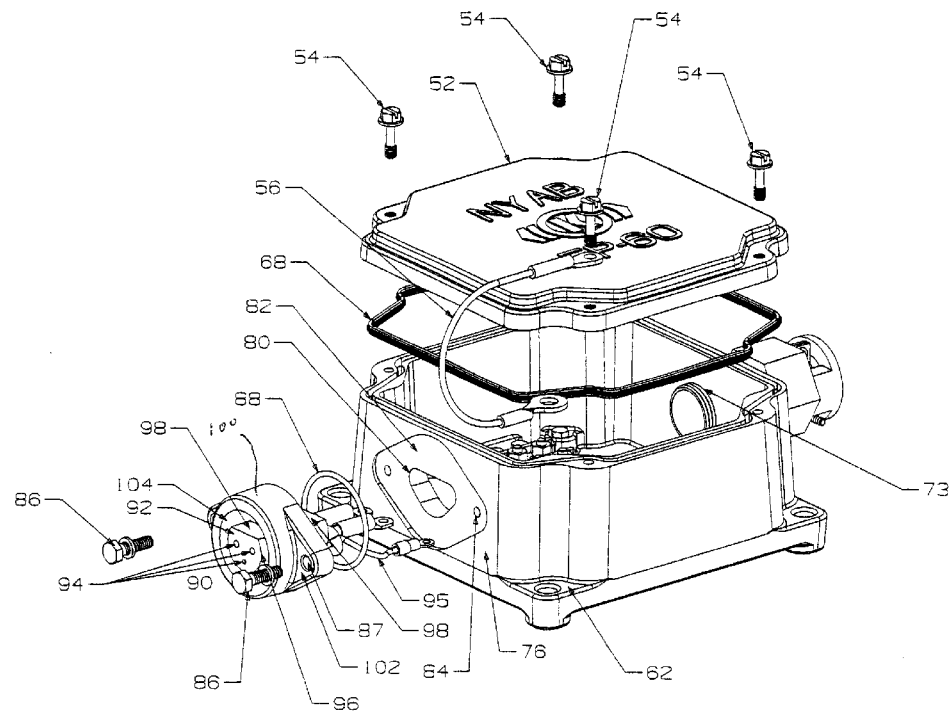
FIG. 5 is an exploded view of a junction box incorporating the principles of the present invention.

As illustrated in FIG. 4, the top surface of the body 60 includes threaded apertures 64 to receive the fasteners 54 of the lid 52. It also includes a recess 66 continuously therearound. A gasket 68, shown in FIG. 5, is form-fitted and received in the recess 66. This provides a moisture-tight seal between the body 60 and the lid 52.

The body 60 includes a base 70 with side walls 72, 74, 76, 78. Ears 62 extend laterally from the base 70. The terminal block 16 is mounted to the base 70. A pair of grounding screws 79 are provided in the base 70. A fitting 20, as described with respect to FIGS. 1 and 2, is mounted in an opening 73, shown in FIG. 5, in the side wall 72 of the body 60.

Figure 6:
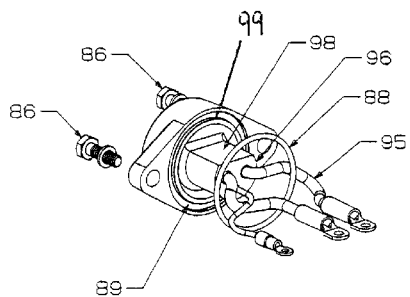
FIG. 6 is a rear perspective view of an electrical connector incorporating the principles of the present invention.

Side wall 76 includes a non-circular opening 80 to receive an end of car fitting or connector 90. The non-circular opening 80 is shown as a generally triangular shape. Wall 76 also includes a recess surrounding the opening 80 to mate with the end of car connector 90 to create a seal at the face of the housing 50 about the opening 80. Apertures 84 are provided on the wall 76 to receive fasteners 86, which secure the end of car connector 90 to wall 76. A gasket 88, illustrated as an o-ring, is positioned between the wall 76 and the end of car connector 90. As illustrated in FIG. 6, the gasket 88 may reside in a recess 89 provided on the back face of the end of car connector 90.

As illustrated in FIGS. 5 and 6, the end of car connector 90 includes a receptacle 92 having a non-circular shape and is the same as receptacle 40. It includes a circular portion 96 and a flat portion 98. The circular portion 96 and the flat portion 98 cooperate with the opening 80 to create an anti-rotational fit. The end of car connector 90 includes a receptacle 92 having three receptacle openings 94. Wires 95 connect the receptacles 94 to the terminal block 16.

The end of car connector 90 includes a flange 100 about the receptacle 92. The flange includes ears 102, which include openings 87 through which pass the fasteners 86. The shape of the flange 100 mates with the recess 82 in wall 76 of body 60. As previously shown in FIG. 6, the recess 89 for a gasket 88 is in the flange portion 100 of the end of car connector 90. Internal threads 104 in flange 100 receive the external threads of the cable connected to the end of car connector 90.

Figure 9:
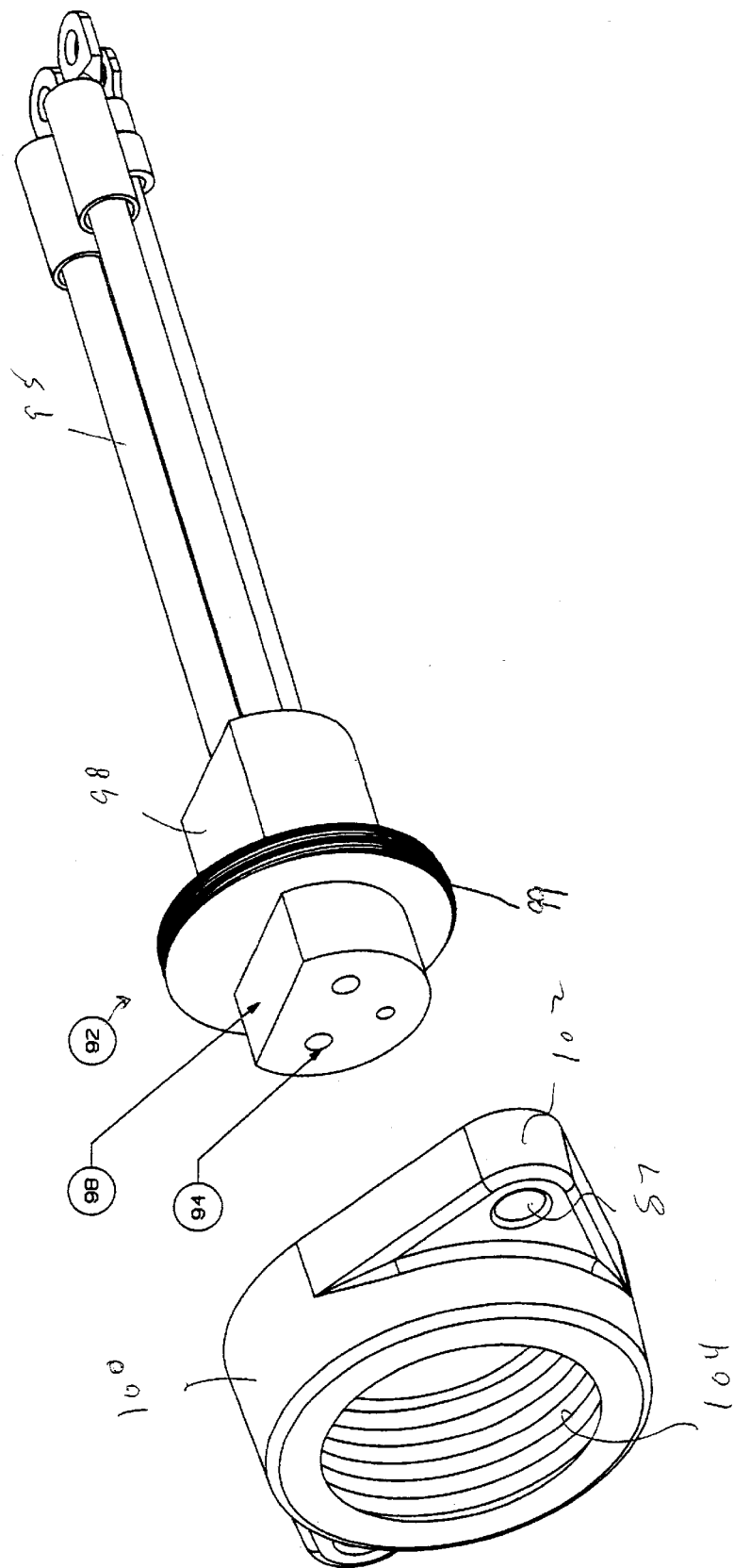
FIG. 9 is an exploded view of a receptacle according to the principles of the present invention.

The flange 100 is shown formed as a integral part of the receptacle 92. Alternatively, the receptacle 92 may have an external threaded portion 99, and the flange 100 is threadably received thereon by threads 104, as shown in FIG. 9. The flange 100 secures the receptacle 92 and the end of the car connector 90 to the housing 50 and aids in creating the liquid-tight seal. The non-rotational fit of the receptacle 92 with the opening 80 and the flange 100 with the body 60 aids in anti-rotational function.

Figure 7:
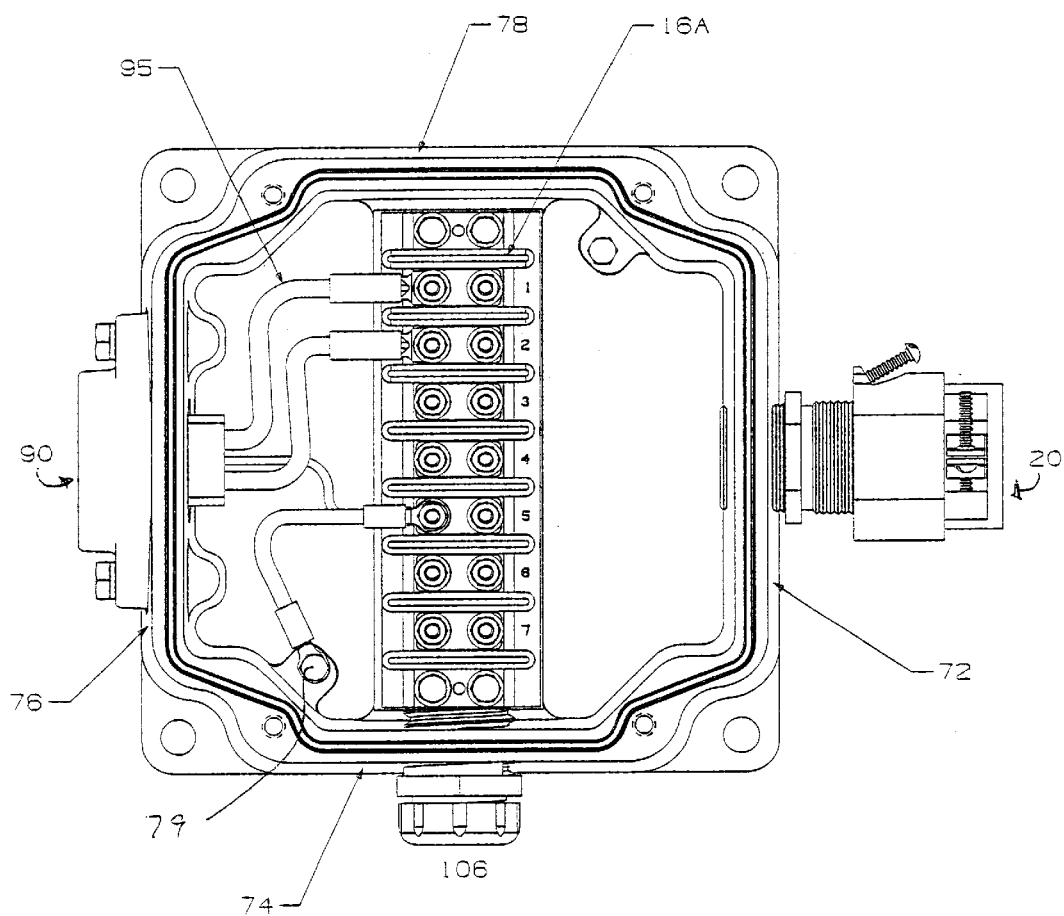
FIG. 7 is a plane view of another junction box incorporating the principles of the present invention with the lid removed.
Figure 8:
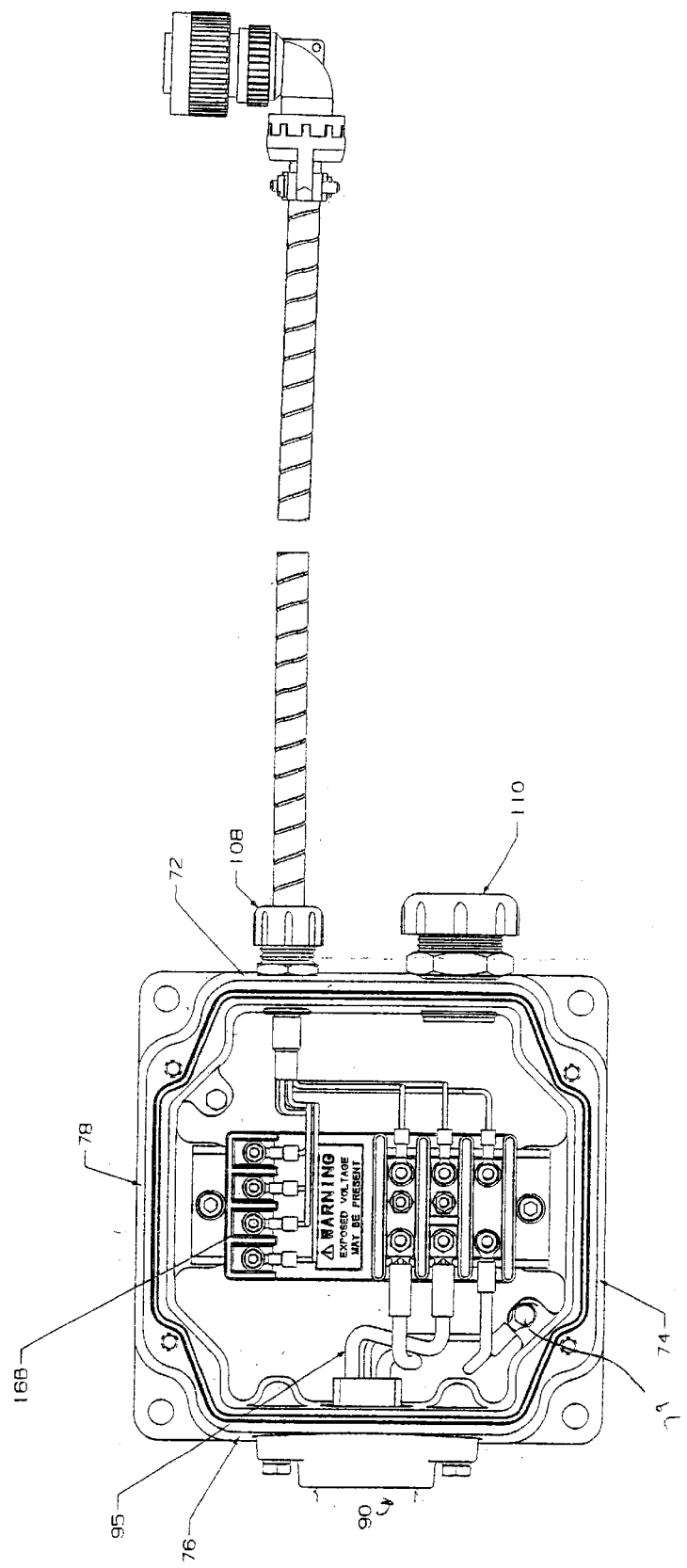
FIG. 8 is a plane view of even another junction box incorporating the principles of the present invention with the lid removed.

A review of FIGS. 4, 7 and 8 will indicate that the housing 50 has a profile or foot print, which is rectangular and generally square. This allows for the symmetrical mounting of the junction box to the car body.

Whereas FIGS. 3–5 have shown a junction box typical for a freight application of a 5-pole terminal block with a C-fitting, FIGS. 7 and 8 show additional embodiments. FIG. 7 shows a basic locomotive application, which is a 7-pole terminal block with an EOC fitting 90 on wall 76. The strain relief 20 is mounted on wall 74 instead of wall 72. There is also another fitting 106 on wall 78. It shows a threaded sleeve or lock nut and a retainer. FIG. 8 shows a freight application having an IDM fitting with EOC fitting 90 on wall 76. The IDM fitting is shown at 108 on wall 72 adjacent to the strain relief fitting 20. Since fittings 106, 108 are well known, they are not described in detail and only show variations of the ability to form additional openings in any of the walls of the junction box housing for different types of junction boxes used throughout the train. Also, different terminal blocks 16 are illustrated for each application.

Although the present invention has been described and illustrated in detail, it is to be clearly understood that this is done by way of illustration and example only and is not to be taken by way of limitation. The spirit and scope of the present invention are to be limited only by the terms of the appended claims.

What is claimed:

1. A junction box for a trainline comprising:

a housing having a body and a lid;

a first non-circular opening in a first side wall of the body;

an electrical connector extending through the opening;

a first portion of an exterior surface of the connector having a non-circular shape and forming an anti-rotational fit with the first opening;

a flange of the connector mounted to an exterior surface of the first wall and sealing the first opening;

wherein the connector includes an electrical receptacle including the first portion of the exterior surface of the connector and a threaded second portion of the exterior surface of the connector; and the flange includes an interior thread joining the flange to the receptacle at the second portion.

2. The junction box according to claim 1, wherein the flange is a unitary portion of the connector.

3. The junction box according to claim 1, wherein the flange includes a pair of ears and a fastener extends through each ear into the first side wall.

4. The junction box according to claim 1, including a recess in the first side wall receiving the flange.

5. The junction box according to claim 1, including a recess in a top surface of the housing body and a gasket in the recess.

6. The junction box according to claim 1, wherein the lid includes self-retained fasteners.

7. The junction box according to claim 1, including a lanyard connected between the body and lid.

8. The junction box according to claim 1, including a terminal block in the housing and the electrical connector includes wires connected to the terminal block.

9. The junction box according to claim 1, including a second opening in a second side wall of the body and a cable fitting extending through the second opening.

10. The junction box according to claim 1, including a gasket between the flange and the first side wall encompassing the first opening.

11. The junction box according to claim 10, wherein the gasket is an o-ring in a recess of the flange.

12. The junction box according to claim 1, wherein the first non-circular opening is generally triangular.

13. The junction box according to claim 12, wherein the non-circular shape of the first portion of the connector is circular with a flat.

14. The junction box according to claim 1, wherein the housing includes external ears extending laterally from a base of the side walls of the body, each ear having an opening for a fastener to mount the housing to a rail vehicle.

15. The junction box according to claim 14, wherein a foot print of the housing with the ears is rectangular.

16. The junction box according to claim 14, wherein a foot print of the housing with the ears is square.

17. A junction box for a trainline, comprising:
a housing having a body and a lid;
a triangular opening in a first side wall of the body;
an electrical connector extending through the triangular opening;
a portion of an exterior surface of the electrical connector being circular with a flat and forming an anti-rotational fit with the triangular opening; and
a flange of the electrical connector mounted by fasteners to an exterior surface of the first side wall and sealing the triangular opening.

* * * * *

UNITED STATES PATENT AND TRADEMARK OFFICE
CERTIFICATE OF CORRECTION

| | | |
|---|---|---|
| PATENT NO. | : 6,669,506 B2 | Page 1 of 1 |
| APPLICATION NO. | : 10/138269 | |
| DATED | : December 30, 2003 | |
| INVENTOR(S) | : Steven R. Newton | |

It is certified that error appears in the above-identified patent and that said Letters Patent is hereby corrected as shown below:

In Figure 8, reference numeral "110" should read --20--.

Column 3, line 16, delete "58" and insert --(not shown)--.

Column 4, line 15, after "block" insert --16A--;

line 16, delete "wall 74 instead of";

line 17, delete "also another" and insert --a--; delete "78"

and insert --74--;

line 19, after "having" insert --a 7-pole terminal block 16B,--;

delete "with" and insert --on wall 72 and an--;

line 20, delete "The" and insert --An--.

Signed and Sealed this

Fifteenth Day of January, 2008

JON W. DUDAS
*Director of the United States Patent and Trademark Office*